United States Patent [19]

Thiele et al.

[11] Patent Number: 4,526,907
[45] Date of Patent: Jul. 2, 1985

[54] PROCESS AND DEVICE FOR THE PREPARATION OF A REACTION MIXTURE OF AT LEAST TWO COMPONENTS FOR THE PRODUCTION OF FOAMS

[75] Inventors: Heino Thiele, Ludwigshafen; Werner Weber, Mannheim; Peter Taubenmann, Munich, all of Fed. Rep. of Germany

[73] Assignee: BASF Aktiengesellschaft, Ludwigshafen, Fed. Rep. of Germany

[21] Appl. No.: 607,187

[22] Filed: May 4, 1984

[30] Foreign Application Priority Data

May 7, 1983 [DE] Fed. Rep. of Germany ....... 3316787

[51] Int. Cl.³ ............... C08G 18/14; C08G 18/08; B67D 5/14; C08F 6/00
[52] U.S. Cl. .................... 521/133; 222/55; 222/57; 521/99; 521/908; 521/917; 528/483
[58] Field of Search ............. 521/133, 908, 917, 99; 222/55, 57; 528/483

[56] References Cited

U.S. PATENT DOCUMENTS

| | | | |
|---|---|---|---|
| 4,157,427 | 6/1979 | Fuber | 521/133 |
| 4,376,172 | 3/1983 | Belangee et al. | 521/133 |
| 4,448,902 | 5/1984 | Coblenz et al. | 521/917 |

*Primary Examiner*—Herbert S. Cockeram
*Attorney, Agent, or Firm*—Joseph D. Michaels

[57] ABSTRACT

When producing molded foam parts from liquid reaction components, the charge of gas in the initial components has a significant effect on the foam structure and quality of the molded part. This invention provides a process and apparatus for introducing a gas into at least one of the liquid reaction components prior to mixing said components for reaction. The component which is to be charged with gas is circulated from a feed tank through a recycle circuit to a compression zone which is maintained at a higher pressure than that of the feed tank. Said gas is admixed with said component at the point of initiation of the compression zone and the higher pressure is relieved through a throttle element prior to returning the gas-charged component to the feed tank. A finely divided stable gas dispersion which can be mixed with other components for reaction is obtained.

4 Claims, 2 Drawing Figures

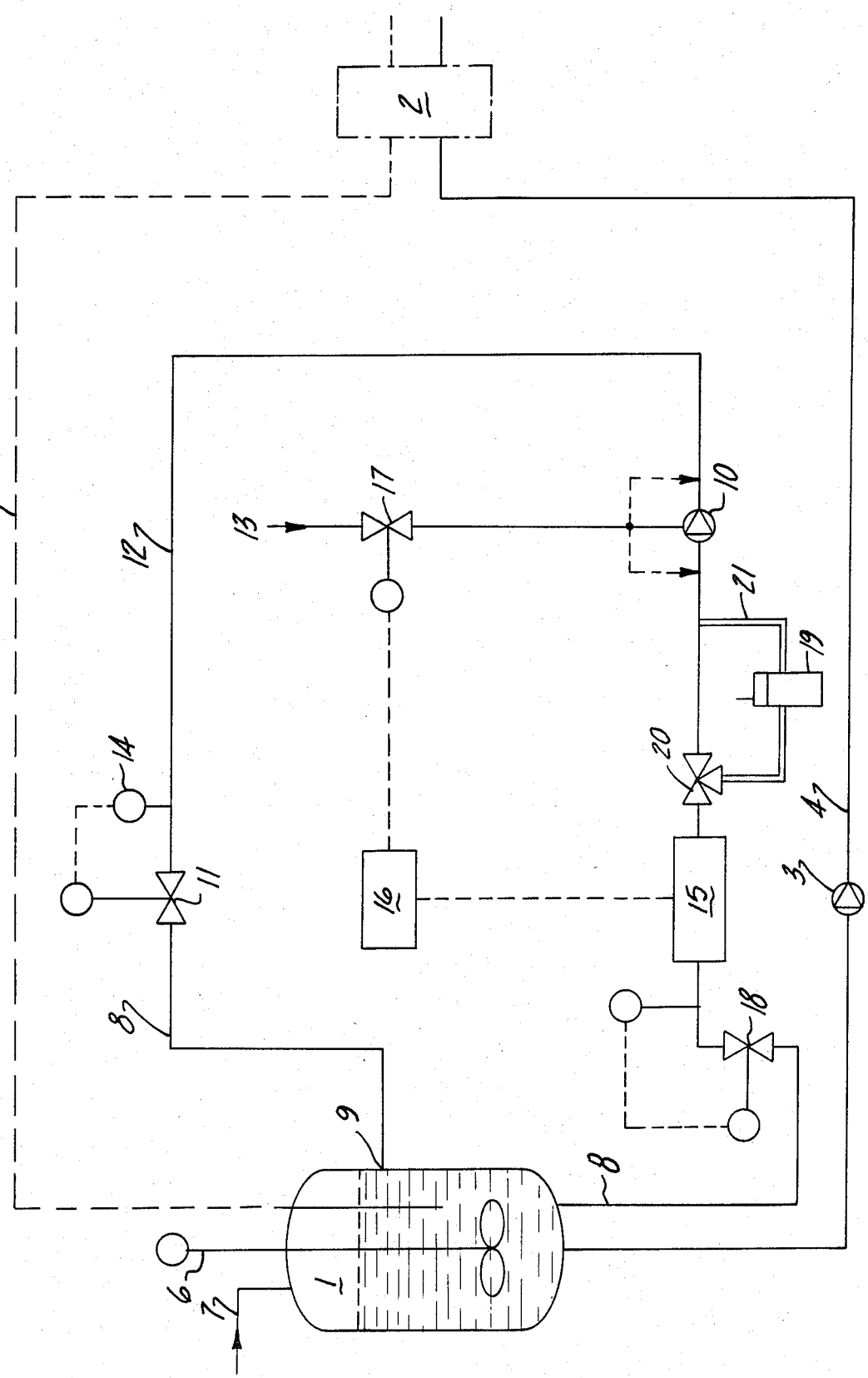

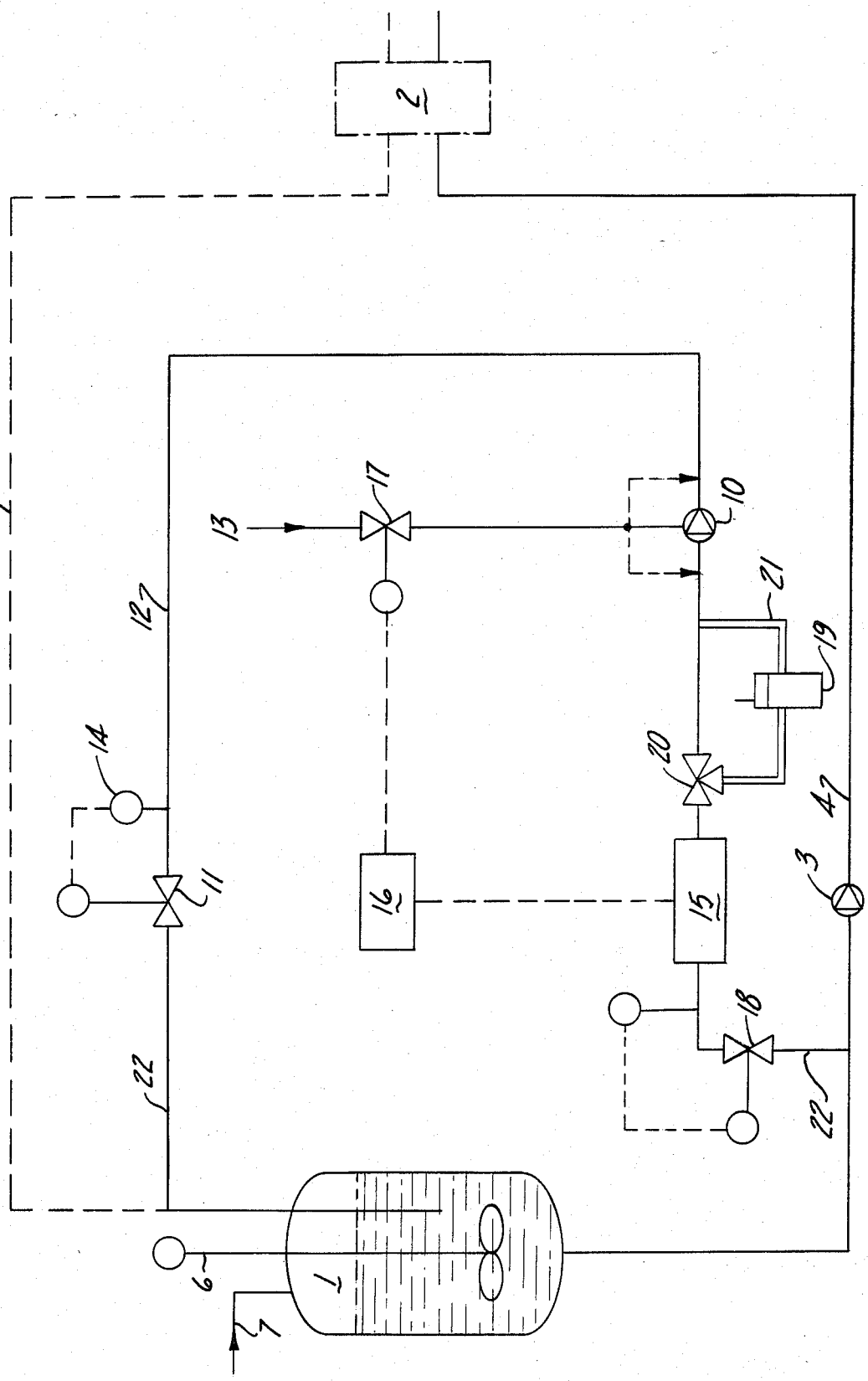

PROCESS AND DEVICE FOR THE PREPARATION OF A REACTION MIXTURE OF AT LEAST TWO COMPONENTS FOR THE PRODUCTION OF FOAMS

BACKGROUND OF THE INVENTION

1. Field of the Invention

This invention relates to the field of plastic foams. More specifically, it relates to a process and apparatus for introducing a gas into at least one of the reaction components so as to obtain a foam with a uniformly sized and distributed cell structure.

2. Description of the Prior Art

When producing molded parts of polyurethane foam, the charge of gas in the initial components has a significant effect on the foam structure and quality of the molded part. Dissolved gases and trapped gas bubbles change the viscosity and density of the component mixture. Gas charging not only affects mixing quality and machine adjustment, it also significantly alters foam structure and foam density distribution. It serves as a nucleating aid.

Even visual examination of the foam parts permits conclusions to be drawn relative to gas charging. With low gas charging, a dark molded part with a few large cells is obtained. As gas charging increases, the foam becomes lighter and the number of cells per unit volume increases, their radius becomes smaller. A qualitatively good foam must contain at least a given amount of gas. This is true both for flexible foams and for rigid and integral-skin foams.

In order to achieve this end, it has already been proposed that gas be introduced directly into the mixing chamber of a mixing head. Here, however, the component mixture leaves the mixing chamber in an uneven or atomized manner, which has a disadvantageous effect on even and accurate pouring. Moreover, adding gas to the supply tank in order to mix it with the corresponding component has also proven to be extremely unreliable. When the gas is introduced into the component in the supply tank by means of an agitator, the gas again separates very quickly from the component, so that introducing the gas is largely ineffective.

In addition, DE-OS No. 25 44 559 also describes charging one or both components with gas before actual reaction mixing takes place. To do this, the stream of reaction component which is to be charged with gas is constricted and, by maintaining the respective component flow rate, a vacuum is produced in the axis of said constriction. The gas is added in the area of this vacuum and thereby mixed into the component. However, the size of the gas bubbles which can be achieved in the components using this method is not generally sufficient to prevent a large degree of bubble coalescence from taking place or to assure that the gas content will be highly dispersed in the components, in particular when such components must be kept on hand in tanks for a relatively long time.

Thus, the objective of the invention was to develop a process and device with which gas used in preparing a reaction mixture of at least two reaction components could be dispersed in one of the components in a simple manner in the most uniform and finely divided possible manner.

SUMMARY OF THE INVENTION

This invention is a process for the preparation of a reaction mixture from at least two reaction components for the production of plastic foams in which the liquid components are delivered separately from individual feed tanks under pressure to a mixing zone and are mixed for reaction, at least one of the components is charged with a chemically inert gas in a recycle circuit having a compression zone wherein the pressure is maintained higher than that of the feed tank, said gas being admixed with the reaction component at the point of initiation of the compression zone and said higher pressure being relieved immediately following downstream of the compression zone prior to return to the feed tank. Auxiliary equipment to measure gas content, regulate input and reduce concentration of gas in the component are present in the recycle circuit.

BRIEF DESCRIPTION OF THE DRAWINGS

FIG. 1 is a schematic drawing showing a recycle line added to the normal feed line-return line connecting a supply tank and a mixing zone.

FIG. 2 is a schematic drawing showing a by-pass line from the feed line to the return line of a prior art system.

DESCRIPTION OF THE PREFERRED EMBODIMENTS

In the invention gas can be mixed into one reaction component with comparative ease and in a very effective manner provided that said component is recirculated from the supply tank by means of a delivery unit in a separate recycle circuit or if the component flows through a bypass between the component feed and component return. The gas is preferably introduced in the suction area of the circulation pump. Gas can also be supplied on the discharge side of the circulation pump or directly into the pump, but this requires a comparatively higher gas pressure and is, therefore, only used when the performance of the pump would be adversely affected by higher gas content in the component. In particular, air, nitrogen, and, in some cases, carbon dioxide are used as the gas.

The two-phase gas-reaction component mixture present after the gas has been introduced is brought to a higher level of pressure in a compression zone located directly downstream from the circulating pump. The pressure in this compression zone can vary across a wide range and it is increased relative to the 1 to 5 bar pressure in the supply tank, preferably by from 0.5 to 200 bar, more preferably by from 3 to 20 bar. When this takes place, the gas is at least partially dissolved in the component. The compression zone is generally sized such that the residence time of the gas-reaction component mixture is approximately 1.5 to 200 sec., preferably from 1 to 20 sec. The residence time of the gas-reaction component mixture depends on the solubility of the gas in the component, in other words on the type of gas selected as well as on the composition of the component and the component temperature, and it can be easily determined by simple preliminary tests.

Downstream from the compression zone the gas-reaction component mixture is again released with the aid of a throttle element to the pressure of the supply tank and is returned to the supply tank. Suitable throttle elements are, for example, precision control valves as well as adjustable components such as nozzles, diaphragms, etc. The action of the throttle element causes the gas to be at least partially liberated once again and the result is gas bubbles which are small and uniformly distributed in the component. Intensive mixing of the component in the supply tank is not necessary to maintain or re-establish the dispersed condition. In addition, further measures to finely disperse the gas in the component are not necessary, even during charging into the mixing zone.

The device of the invention for performing this process is characterized by the fact that the gas feed line merges into a recycle line provided with a delivery pump or into a bypass between the feed and return line and by the fact that a throttle element is provided at a distance from the point where the gas feed line merges. The delivery pump and the throttle element, moreover, produce an increase in pressure between these locations. This pressure is necessary to dissolve and disperse the gas which has been metered in. In a further characteristic of the invention, an analyzer is provided in the recycle line or in the bypass ahead of the metering pump to determine the gas content in the component, so that the gas charged into the component can be analyzed in a rapid and reproducible manner. Among those measurement methods which can be used here are processes which utilize the following physical phenomenon: the partial pressure, the absorption of a beam of light, the density as well as the compressibility and solubility of a gas. These measuring methods are known and are described in *Kunststoffe* 67 (1977), 284–287.

In a particular embodiment, the analyzer is coupled to a control device so that the charging of gas into the component no longer needs to be controlled manually, but rather can be performed automatically. The control unit can be used both to control the addition of gas and to control the pressure of the component in the recycle line or in the by-pass.

The following section gives a closer description of the device of the invention with reference made to the drawings.

FIGS. 1 and 2 provide a schematic representation of a high-pressure mixing device with a supply tank (1) for one component and a mixing head (2). The supply tank and mixing head are connected to one another through a feed line (4) containing a metering pump and a return line (5). An agitator (6) is indicated in the supply tank. A gas feed line (7) is provided to maintain a given tank pressure. To keep the drawing simple, the supply tank and piping system for the other component are not shown.

A recycle line (8) routed in a separate circuit is connected to the supply tank (1). This recycle line returns to the supply tank at (9) (FIG. 1). A delivery pump (10) and a throttle element (11) are provided in the recycle line. Section (12) of the recycle line between the delivery pump and the throttle element is designed to be a compression zone.

The component charged with gas is recirculated prior to being mixed with the other component by means of the delivery pump (3). Here the supply of gas through the gas feed line (13) runs directly into the suction area and/or pressure area of the delivery pump, or, if necessary, also directly into the delivery pump. The pressure required for effective adsorption of the gas in the compression zone (12) is adjusted by means of the delivery pump and the throttle element (11). This pressure is measured by means of a sensor (14). The observed value can be indicated directly and can be used for adjusting the throttle element by hand. It is also possible to use this observed value for automatically controlling the throttle element by means of an adjusting device.

Continuous conditioning of the components in the supply tank (1) to a specified gas content independent of the operating condition of the remaining mixing device is possible through use of the component circuit which is independent of the metering pump (3). In particular, in production plants with high outputs and short pause times, in which mixing with the other component does not take place, additional advantages are achieved, for example, by eliminating the interruptions in the charging of gas to one or both components which would otherwise be necessary.

In order to determine the gas content in the component, a corresponding analyzer (15) is located in the recycle line (8) ahead of the delivery pump (10). The analyzer is connected to a regulating device (16) which acts on a valve (17) in the gas feed line (13). Depending on the deviation of the observed value from a specified value, the gas feed or also the output of the delivery pump (10) can be changed.

In order to increase the accuracy of gas charging measurements, a throttle valve (18) is provided ahead of the analyzer (15). This valve can be used to lower the component pressure to a value lower than the tank pressure. In this way, the portion of gas dissolved in the component can be partially or completely determined in addition to the portion of gas dispersed in the component.

Finally, the recycle line contains a degassing device for removing excess amounts of gas in the component. It is controlled by a three-way valve (20). When this valve is open, the gas-reaction component mixture flows through the degassing device, whereby a portion of the gas is released, and then the mixture flows through piping section (21) back into the delivery pump (10) suction area.

As FIG. 2 shows, the charging of gas to one or both components can also take place in a bypass (22) between the feed line (4) and the return line (5). Such a design may be used when the delivery output of the metering pump (3) is not affected by the component flow in the bypass.

In special cases, for example with very high gas charging of the reaction components in the supply tank (1), it is advantageous to tap off part of the flow of the gas-reaction component mixture ahead of the throttle element (11) and direct this partial flow to the metering pump (3).

For the production of foams it is possible, according to the invention, to adjust by simple means the gas content in the starting components of each foam system. The component throughput, the pressure level in the circuits, and also the amount of gas added can be controlled relative to amount and time, so that gas contents up to 35 vol. percent can be achieved in the components. In order to achieve a high degree of production reliability and greater variability, all the relevant observed values for a process sequence can also be fed into a computer, processed there, and the set signals can be further transmitted to the various control elements. The computer can also be used to determine the equilibrium values between the gas and the respective liquid component relative to pressure, temperature and component composition in order to convert the observed gas content to standard conditions.

The embodiments of the invention in which an exclusive privilege or property is claimed are defined as follows:

1. A process for the preparation of a reaction mixture from at least two liquid reaction components for the production of plastic foams wherein said components are delivered separately from individual feed tanks to a mixing zone and mixed for reaction, and wherein further, at least one of said components is charged with a chemically inert gas in a recycle circuit having a compression zone which is maintained at a higher pressure than that of the feed tank, said gas being admixed with the reaction component at the point of initiation of the compression zone and said higher pressure being relieved through a throttle element prior to return of the gas-charged liquid to the feed tank.

2. The process of claim 1 wherein the recycle circuit contains a compression zone determined by a circulation pump and a throttle element, pressure sensing devices downstream of the feed tank and upstream of the throttle element, a gas concentration analyzer coupled with a gas feed control, and a degassing unit for removing excess gas from the reaction component.

3. The process of claim 2 wherein the recycle circuit is an independent conduit completely separate from the feed circuit and which runs from the feed tank to the compression zone and returns to the feed tank.

4. The process of claim 2 wherein the recycle circuit is a conduit which by-passes the mixing zone and runs from the feed line to the return line to complete the circuit.

* * * * *